United States Patent
Alapuranen

(10) Patent No.: US 8,537,926 B2
(45) Date of Patent: Sep. 17, 2013

(54) COGNITIVE RECEIVER ARCHITECTURE

(75) Inventor: Pertti Alapuranen, Deltona, FL (US)

(73) Assignee: XG Technology, Inc., Sarasota, FL (US)

( * ) Notice: Subject to any disclaimer, the term of this patent is extended or adjusted under 35 U.S.C. 154(b) by 0 days.

(21) Appl. No.: 13/428,225

(22) Filed: Mar. 23, 2012

(65) Prior Publication Data

US 2012/0314823 A1 Dec. 13, 2012

Related U.S. Application Data

(60) Provisional application No. 61/494,485, filed on Jun. 8, 2011.

(51) Int. Cl.
*H04B 7/02* (2006.01)
*H04L 27/06* (2006.01)

(52) U.S. Cl.
USPC .......................................... 375/267; 375/340

(58) Field of Classification Search
USPC ............... 375/259, 260, 267, 295, 299, 316, 375/340, 341, 346, 347, 349, 285; 455/39, 455/68, 69, 73, 91, 101; 714/699, 746, 752, 714/762
See application file for complete search history.

(56) References Cited

U.S. PATENT DOCUMENTS

| | | | | |
|---|---|---|---|---|
| 6,128,355 A * | 10/2000 | Backman et al. | | 375/347 |
| 6,161,209 A * | 12/2000 | Moher | | 714/780 |
| 6,298,092 B1 * | 10/2001 | Heath, Jr. et al. | | 375/267 |
| 2004/0095907 A1 | 5/2004 | Agee et al. | | |
| 2005/0259083 A1 | 11/2005 | Flowers | | |
| 2007/0153942 A1 * | 7/2007 | Zeng et al. | | 375/340 |
| 2009/0213955 A1 * | 8/2009 | Higuchi et al. | | 375/267 |
| 2009/0290618 A1 * | 11/2009 | Kim et al. | | 375/219 |
| 2009/0323619 A1 * | 12/2009 | Tajer et al. | | 370/329 |
| 2011/0142108 A1 | 6/2011 | Agee et al. | | |

\* cited by examiner

*Primary Examiner* — Sam K Ahn
*Assistant Examiner* — Vineeta Panwalkar
(74) *Attorney, Agent, or Firm* — Dennis L. Cook, Esq.

(57) ABSTRACT

This invention describes a cognitive radio receiver architecture where multiple specialized receiver algorithms are executed in parallel. For example, maximal ratio combiner and beam forming algorithms may be running parallel. The receiver system computes solutions using different hypotheses of channel conditions and chooses the best result, i.e. is able to decode data from one of the parallel receivers.

6 Claims, 1 Drawing Sheet

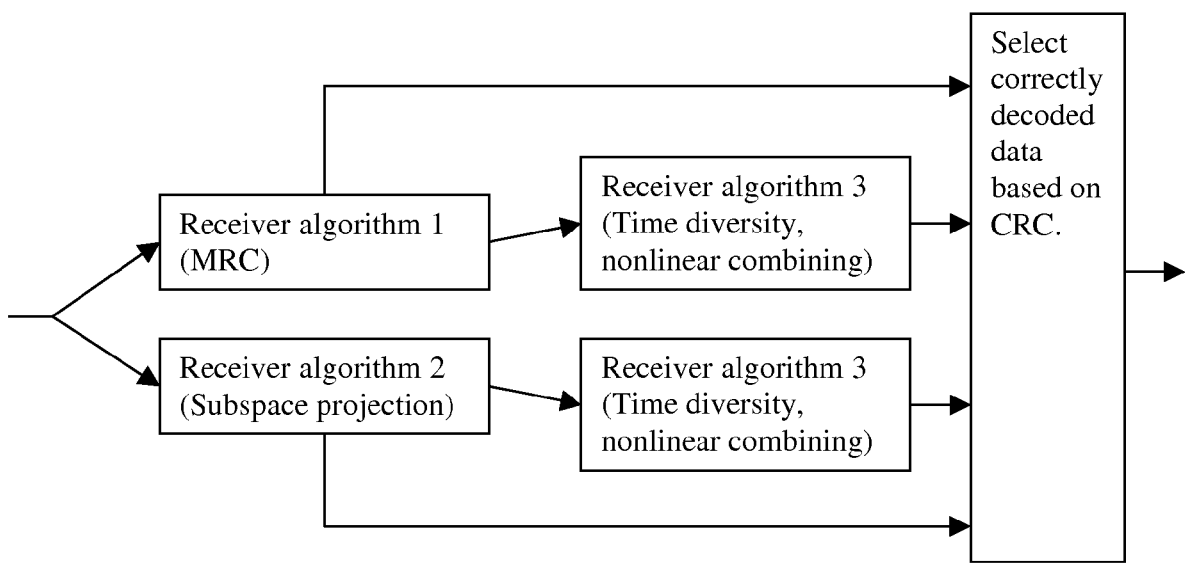

COGNITIVE RECEIVER ARCHITECTURE

CROSS-REFERENCE TO RELATED APPLICATION

The present application claims the benefit of previously filed co-pending Provisional Patent Application, Ser. No. 61/494,485 filed Jun. 8, 2011.

FIELD OF THE INVENTION

This invention describes a cognitive radio receiver architecture where multiple specialized receiver algorithms are executed in parallel. For example, maximal ratio combiner (MRC) and beam forming algorithms may be running parallel. The receiver system computes solutions using different hypotheses of channel conditions and chooses the best result, i.e. is able to decode data from one of the parallel receivers.

BACKGROUND OF THE INVENTION

Classical cognitive radios change frequency channels when the radio detects that the interference level or other parameters associated with operation can be improved by moving to another frequency. Modern signal processing and multiple antenna technologies, however, allow expanded cognitive operation where receiver algorithms and transmit waveforms can be instantly and dynamically adjusted for operation in a particular environment.

Radio spectrum is a limited resource. A large amount of spectrum is required to deliver services that are associated with modern wireless personal communications. Typical examples are smart phone Internet applications, wireless streaming audio, and video, to mention a few. These services consume large amounts of spectral resources causing both financial and spectrum policy issues.

Typically these services are provided using licensed spectrum. The financial burden from licensing can be defined as a cost of billions of dollars, even for a relatively small amount of spectrum, when compared to freely available unlicensed spectrum. The licensing, however, is required to make sure that current 1G to 4G radio technologies have the coordinated access they require to deliver quality of service that is adequate for an end user application.

Currently in the United States there are several hundred MHz of unlicensed spectrum that can be used for delivering wireless services to consumers, however, traditional radio technologies typically suffer from interference from uncoordinated access from other unlicensed users. A novel radio technology is required that can deliver service while being highly resistant to interference and also creating as little interference as possible to other users in the unlicensed band.

BRIEF SUMMARY OF THE INVENTION

The invention disclosed in this application is an intelligent radio (cognitive) receiver using multiple receive algorithms. This type of cognitive receiver system will detect conditions that the receivers operate in and use that information to enhance the capability to communicate.

This invention describes a cognitive radio receiver architecture where multiple specialized receiver algorithms are executed in parallel. For example, maximal ratio combiner (MRC) and beam forming algorithms may be running parallel. The receiver system computes solutions using different hypotheses of channel conditions and chooses the best result, i.e. is able to decode data from one of the parallel receivers.

Therefore the objects of this invention include the following:

A cognitive receiver structure where multiple parallel receivers are used, each of which is optimized for a certain type of interference or channel conditions. For example, the first receiver uses a MRC algorithm, the second uses MIMO beam forming or subspace projection and the third mitigates burst errors using redundancy.

A receiver that analyzes the type of interference and informs the transmitter of the interference by reporting the receiver algorithms that successfully decoded the data. The radio can use the knowledge of successful algorithm decoding to adjust receiver parameters, including bandwidth, selectivity filtering, and antenna selection to mention a few.

A cognitive receiver structure that uses MRC and subspace based interference mitigation methods in parallel as a first stage and uses redundancy based decoding as a second stage. In this type of system the first receiver stages help to mitigate effects of fading or long duration interference and the second stage combines pieces from redundant bursts into one correct frame where burst interferers are mitigated.

A receiver where a MIMO antenna system is used to generate data for the described receiver architecture and the receiver algorithms can use a number of different RF chains.

A receiver where some MIMO receiver paths including RF electronics are turned off when not required to complete a RF link.

For a fuller understanding of the nature and objects of the invention, reference should be made to the following detailed description taken in connection with the accompanying drawing.

DESCRIPTION OF THE DRAWINGS

For a fuller understanding of the nature and objects of the invention, reference should be made to the accompanying drawing, in which:

FIG. 1 is a diagram showing a block diagram of the cognitive receiver architecture of the preferred embodiment.

DETAILED DESCRIPTION OF THE INVENTION

The goal behind the invention is to create a more intelligent cognitive radio receiver by using multiple receiver algorithms. This type cognitive receiver system will detect conditions that the receivers operate on and use that information to enhance the capability to communicate.

The receiver system consists of multiple individual receivers operating together. A block diagram of the architecture is shown in FIG. 1.

In FIG. 1 MRC and subspace projection based algorithms are executed in parallel in the first stage. At the second stage a redundant decoding based method is applied to both paths of processed data and finally, after FEC decoding, a correctly decoded frame is chosen using a Cyclic Redundancy Check (CRC). Naturally these could be other algorithms and the ones described here are used for the sole purpose of describing the invention. Also the number of algorithms can be larger but the description of the preferred embodiment uses three algorithms.

More specifically the first algorithm is a Maximal Ratio Combiner (MRC) receiver that uses multiple RF chains and coherently combines the received signals to maximize SNR.

This type of receiver performs well in many conditions, including Rayleigh fading, but is not efficient in mitigating interference. The output of this receiver is used directly by the decision making unit or it is used as an input to a second stage that receives processing in case the FEC decoder was not able to produce an error free output.

A second parallel receiver path is a projection based receiver that uses multiple received RF signals to orthogonalize interference. This method computes a projection vector that removes the effect of interference by orthogonalizing the error to the desired signal. To compute this multiple RF receive paths are required to create a higher dimension. Typically 2 to 4 RF receiver chains should be used.

The multiple antenna projection based method described above operates well on signals that are long enough in time domain so that they overlap training signals such that an estimate of the interference can be computed. In reality, however, some interferers transmit bursts that last only a few hundred microseconds and are too short for creating the required model. To mitigate this type of interferer a third receiver is used, one that uses redundancy that can be added to the signal when required. The third receiver uses the two previously described receivers to produce the required input of soft bits, i.e. estimates of the reliability of the bits before they are fed into the FEC decoder.

Similar to the first receiver path the output of the second receiver is FEC decoded and if the decoder is able to produce an error free output then algorithm 3 is not required for reception of the burst.

The third receiver structure uses a data transmission protocol where data is transmitted twice, separating the same information bits in time domain by an amount that is longer than a typical interference burst.

The two redundant parts can be combined as described in the patent provisional application No. 61/494,509, "OFDM Symbol Diversity Combiner for Burst interference Mitigation" filed by the inventor of this application. This algorithm can remove interference by locating it in time domain and then assembling a packet consisting of correct segments. Though being a form of spread spectrum modulation the structure of the waveform allows efficient use of frequency domain processing. The method can be applied to both to MRC or spatial multiplexing based algorithms and also to subspace projection based algorithms as a second stage where projected or decoded symbols are assembled from multiple (minimum of two) identical transmitted signals to create one error free (or signal with reduced amount of errors) packet.

The described system produces information on the type of interference based on what algorithm was able to produce output data successfully, i.e. error free. This information is passed to the transmitter and used to modify modulation and coding parameters. For example, if subspace projection produced error free data then a conclusion can be made that only modulation methods that can use the projection based method should be used when transmitting data. Additionally, if redundancy was required to receive data then the system should use this method for all data that is sent to particular destination. This information is important because lowering the modulation and coding rate in the presence of interference can make data bursts longer thus making them more vulnerable to interference bursts.

Additionally, the described receiver can turn off some RF receive or transmit chains when not required to complete a link. For example, the beam forming receiver could be turned off to save power when operating in conditions where the MRC algorithm or spatial multiplexing based receiver is consistently able to recover data.

The described cognitive receiver informs the transmitter by sending information on:
1) The type of interference detected, i.e. receiver algorithm successfully used to decode data.
2) Classification of the interferer, i.e. burst, narrow band, wide band, and/or long duration interference based on what receiver algorithm decoded the data.
3) Bitmap of the interference as a function of TDM framing structure, i.e. bitmap presenting slots that are affected by interferers. This can be computed from the operation of the redundancy based algorithm.

Since certain changes may be made in the above described system and method for a cognitive receiver architecture without departing from the scope of the invention herein involved, it is intended that all matter contained in the description thereof or shown in the accompanying FIGURE shall be interpreted as illustrative and not in a limiting sense.

What is claimed is:

1. A cognitive receiver structure comprising multiple parallel receivers wherein each of said multiple parallel receivers use different algorithms for different kinds of interference or radio frequency (RF) channel conditions and each of said parallel receivers includes a decoder that decodes a received signal sent by a transmitter and said cognitive receiver structure then selects one of said multiple parallel receivers that produces the best result and that further determines the type of interference and informs said transmitter that sent said received signal of the determined interference by reporting to said transmitter which multiple parallel receiver successfully decoded the data.

2. The cognitive receiver structure of claim 1 wherein a multiple input multiple output antenna system is used to generate data for the cognitive receiver structure and one of said multiple parallel receiver algorithms can use a different RF chain than the rest of said multiple parallel receiver algorithms.

3. The cognitive receiver structure of claim 2 wherein one of said multiple parallel receivers uses a maximal ratio combiner algorithm to decode data and a second of said multiple parallel receivers uses a multiple input multiple output beam forming or subspace projection algorithm to decode data.

4. The cognitive receiver structure of claim 2 wherein one of said multiple parallel receivers uses a maximal ratio combiner algorithm to decode data, a second of said multiple parallel receivers uses a multiple input multiple output beam forming or subspace projection algorithm to decode data, and a third of said multiple parallel receivers uses a redundancy based algorithms to decode data.

5. The cognitive receiver structure of claim 2 wherein one of said multiple parallel receivers uses a maximal ratio combiner algorithm to decode data and a second of said multiple parallel receivers uses a multiple input multiple output beam forming or subspace projection algorithm to decode data as a first stage and redundancy based algorithms to decode data as a second stage and wherein said first stage removes effects of fading or long duration interference and said second stage combines pieces from redundant bursts into one correct frame such that burst interferers are mitigated.

6. The cognitive receiver structure of claim 5 wherein one or more of said multiple input multiple output antenna system receiver paths have their RF electronics turned off when not being used to complete a RF link.

* * * * *